July 4, 1950 E. L. SUTTER 2,514,015
BALLAST UNIT

Filed July 14, 1945 2 Sheets-Sheet 1

INVENTOR.
ERWIN L. SUTTER
BY
his Attorney

July 4, 1950   E. L. SUTTER   2,514,015
BALLAST UNIT

Filed July 14, 1945   2 Sheets-Sheet 2

INVENTOR.
ERWIN L. SUTTER
BY
His attorney

Patented July 4, 1950

2,514,015

UNITED STATES PATENT OFFICE 2,514,015

BALLAST UNIT

Erwin L. Sutter, Sharon, Mass., assignor to Tobe Deutschmann Corporation, Canton, Mass., a corporation of Massachusetts Application July 14, 1945, Serial No. 605,055

2 Claims. (Cl. 175—357)

The present invention relates to a container and more particularly to a container for a ballast unit for fluorescent lighting fixtures. These ballast units are made up of transformers, chokes and condensers for providing the proper transformation and power factor between the line and the fluorescent tube. For the most part the unit is made of coils and condensers which are assembled in a container sealed in with wax and mounted on some part of the lighting fixture.

Under normal operating conditions where the unit is sufficiently cooled or where the heat given off by the unit is not great, operation will continue without great difficulty. If, however, the current drawn through the chokes and transformer windings is large, the coils may heat up and cause the whole ballast unit to operate under extremely high temperature conditions. While the coils may operate successfully at fairly high temperatures under certain conditions, capacitors are often of such construction that while they are able to withstand high voltages, undue heating may cause such deterioration of the dielectric so that the capacitors will burn out.

In the present invention the ballast unit is so constructed that while the transformer windings or coils may operate under high temperature conditions, the capacitors in the ballast unit keep sufficiently cool so that their life will be substantially prolonged. The ballast unit for this purpose is divided into two parts with the windings carrying current comprising a potted assembly wherein the coils are buried in a high melting point wax, wax and asphalt compound or some other suitable insulating substance. The other section of the container is entirely separated from the first section and in it the capacitor is mounted substantially spaced from the walls of the container with circulating air passages to permit heat which may be generated to circulate out of the casing.

In the present invention the capacitor units are also replaceable without the need of melting out the wax or the potting compound, as has usually been the case. The unit itself is preferably mounted on the top or end of the lighting fixture where it may be subjected to heating from the light itself.

The present invention will be more fully described in the specification below in connection with the drawings illustrating an embodiment of the invention in which.

Figure 1:
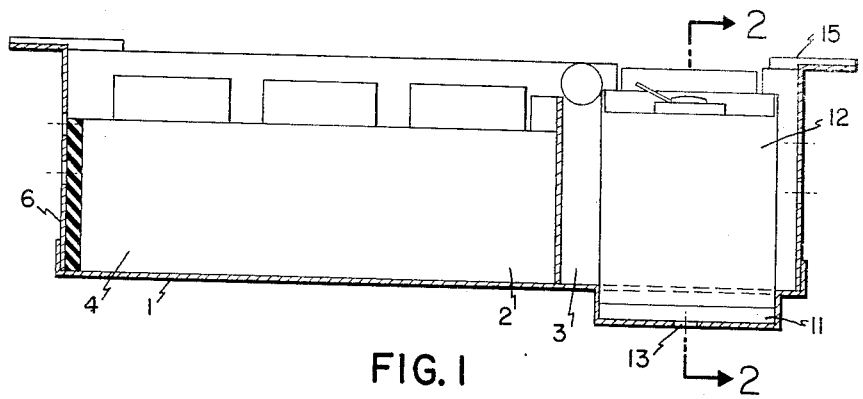
Figure 1 shows a section through the ballast container.
Figure 3:
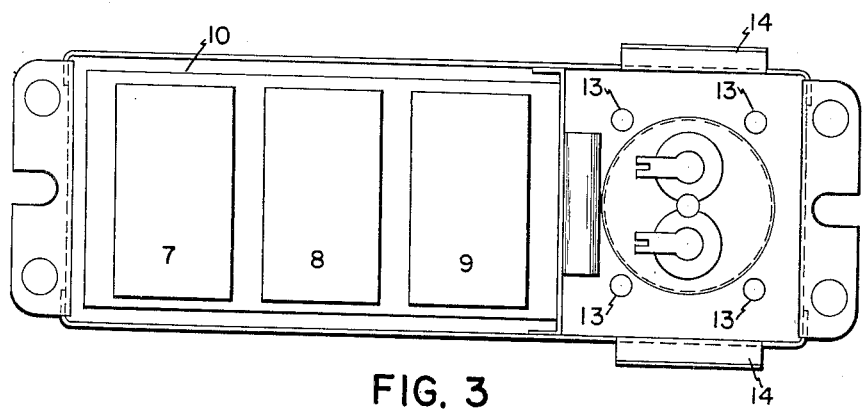
Figure 3 shows a plane view of the arrangement of Figure 1.

In accordance with the arrangement of Figure 1, the container 1 comprises two sections 2 and 3, section 2 being an elongated (preferably rectangular) compartment in which the transformer ballast unit 4 may be securely held between the partitioning wall 5 and the end wall 6. The unit 4, as indicated in Figures 1 and 3, comprises three windings 7, 8 and 9 which may be embedded in a box 10 filled with a high melting point wax or asphalt compound. The section 3 of the container is provided with a bumped out or recessed section 11 which, in Figure 1, is in the lower face of the casing. This recessed section is made sufficiently large to hold a capacitor unit 12 with one end resting in the recessed section 11 of the casing. The recessed section 11 is so situated that when the capacitor 12 is placed in it, the walls of the compartment will be spaced away from the capacitor unit. The base of the compartment 3 surrounding the recess 11 is provided with suitable vent holes 13, 13, 13, 13 establishing, with side louvres 14, an upward circulation path parallel to the axis of the capacitor unit 12. The top of the whole container may be provided with a cover 15.

Figures 2, 9:
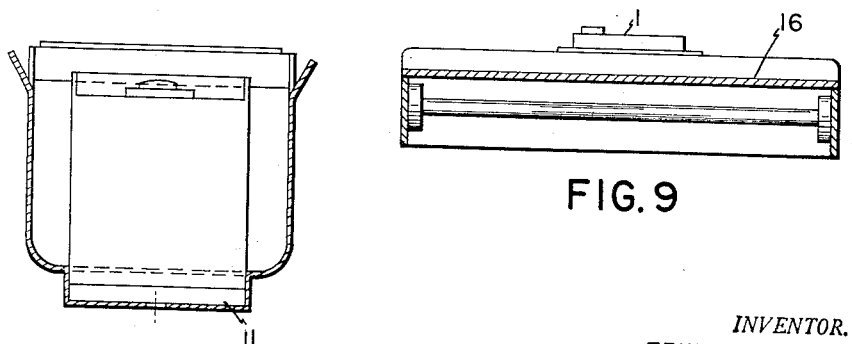
Figure 2 shows a sectional view on the line 2—2 of Figure 1.
Figure 9 shows the relative positioning of the ballast unit on the fluorescent fixture.

The unit itself, as will be seen in Figure 9, is mounted with the cover positioned downward against the plate or wall 16 of the lighting fixture. Both capacitor and coil units are secured in position by a tight fit or other method so that the complete unit may be mounted and positioned in any way that is desired. The capacitor unit may be easily replaced, if desired.

Figure 4:
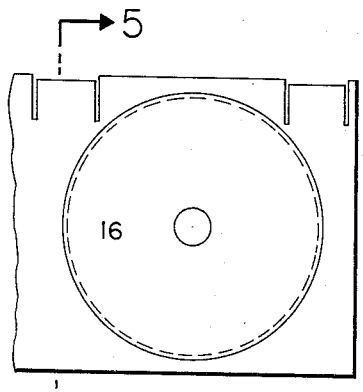
Figure 4 shows a fragmentary view of the modified form of the ballast container corresponding in position to the view of Figure 1.
Figure 5:
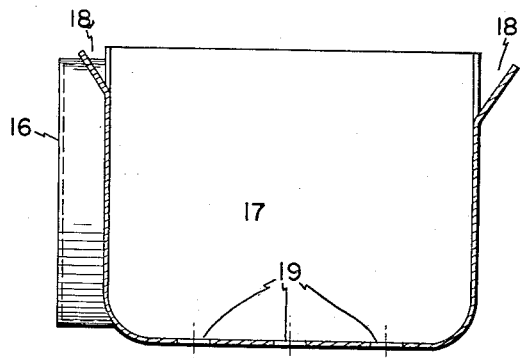
Figure 5 shows a section substantially on the line 5—5 of Figure 4.

Figures 4 and 5 show a modification of Figures 1, 2 and 3 in which the bumped out section corresponding to 11 of Figure 1 is shown by the element 16 extending from the long side of the unit in the compartment 17 corresponding to the compartment 3. In this case, louvres 18 are provided also at the top of the compartment 17 and vent holes 19 at the bottom of the compartment. Circulation in this arrangement will be substantially the same as that in Figures 1 and 2.

Figure 6:
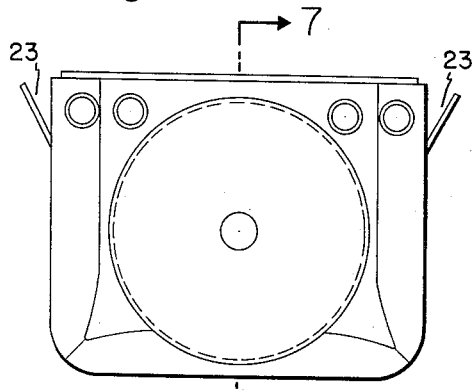
Figure 6 shows a modified end view of the ballast container.
Figure 7:
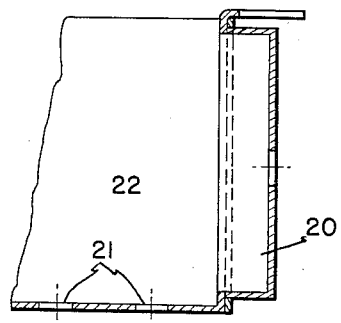
Figure 7 shows a sectional view on the line 7—7 of Figure 6.
Figure 8:
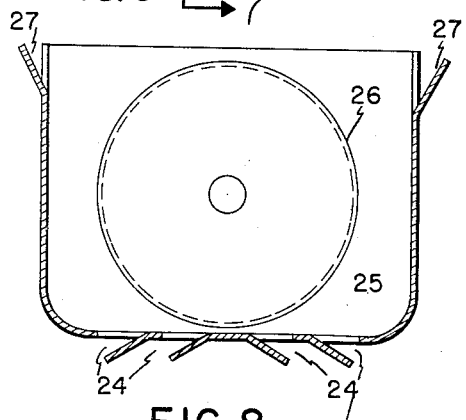
Figure 8 shows a still further modified end view of Figure 6.

In the other alternate form of Figures 6 and 7, the recess or bumped out element is indicated at 20 at the end of the case with the vent holes 21 in the bottom of the compartment 22 and the louvres 23 at the top of the same compartment. In this arrangement, louvre openings are parallel to the axis of the capacitor as is also true in the modification indicated in Figure 8 in which louvres 24, 24, 24, 24 are provided in the base of the compartment 25 corresponding to the compartment 3 of Figure 1 with the bumped out element 26 positioned on the small end of the casing as in Figures 6 and 7 with top louvres 27 parallel to the axis of the capacitor within the compartment.

The arrangement of the alternate means may be used as warranted by the circulation tendencies and also by the space availability for the mounting of the unit. The essential feature in the present arrangement is to separately space the capacitor unit in a compartment apart from the potted current carrying coils with the capacitor unit spaced apart from the walls of the compartment, particularly those compartment walls forming a partition for the potted unit.

In the present invention no particular winding diagram has been shown but the usual connections and circuits for ballast units for fluorescent lighting elements may be used. While the current carrying coils may heat up and give off considerable heat, little of this heat will be radiated or conveyed by conduction or convection to the capacitor unit so that this unit may be kept comparatively cool, at least at a much lower temperature than the coil units. If desired, the inner face of the compartment 3 and the corresponding compartments in the other figures may have highly polished or reflecting surfaces whereby the heat will be reflected and not absorbed. The container itself is made of metal such as sheet metal or any other suitable material.

Having now described my invention, I claim:

1. A container for a ballast unit comprising an elongated casing having a cross partition forming two independent compartments, coil units, means comprising a potting compound for securing said coil units in one of said compartments and insulating the same, said other compartment having a recessed section, a capacitor mounted in said recessed section and spaced apart from the other walls of said other compartment, a plurality of vent holes in said other compartment around the base of said capacitor unit and a plurality of louvres in the walls of said other compartment near the top thereof, and a cover for said casing.

2. A container for a ballast unit comprising an elongated casing having a cross partition forming two independent compartments, coil units embedded in a potting compound secured in and filling one of said compartments, a portion of the wall of said casing in the other of said compartments having a recess formed therein adapted to contain in a snug fit a capacitor unit, a capacitor unit positioned therein, said recess being located whereby said capacitor unit is spaced away from all adjacent walls of the other of said compartments, said latter compartment being provided with a plurality of air vents at the bottom and a plurality of openings at the top, and means covering the top of said compartments.

ERWIN L. SUTTER.

REFERENCES CITED

The following references are of record in the file of this patent:

UNITED STATES PATENTS

| Number | Name | Date |
| --- | --- | --- |
| 899,634 | Thordarson | Sept. 29, 1908 |
| 1,761,535 | Perkins | June 3, 1930 |
| 2,026,060 | Pratt | Dec. 31, 1935 |
| 2,142,705 | Tarr | Jan. 3, 1939 |
| 2,354,078 | Vance | July 18, 1944 |
| 2,359,186 | Zelt | Sept. 26, 1944 |
| 2,385,460 | Omansky | Sept. 25, 1945 |